L. McKAY.
JOURNAL BEARING.
APPLICATION FILED OCT. 7, 1911.

1,052,360.

Patented Feb. 4, 1913.
2 SHEETS—SHEET 1.

Witnesses
Alfred G. Seiler
R. B. Cavanagh

Inventor
Lee McKay
By Victor J. Evans
Attorney

L. McKAY.
JOURNAL BEARING.
APPLICATION FILED OCT. 7, 1911.

1,052,360.

Patented Feb. 4, 1913.
2 SHEETS—SHEET 2.

Inventor
Lee McKay

UNITED STATES PATENT OFFICE.

LEE McKAY, OF DE SOTO, MISSOURI.

JOURNAL-BEARING.

1,052,360.

Specification of Letters Patent. Patented Feb. 4, 1913.

Application filed October 7, 1911. Serial No. 653,348.

*To all whom it may concern:*

Be it known that I, LEE McKAY, a citizen of the United States, residing at De Soto, in the county of Jefferson and State of Missouri, have invented new and useful Improvements in Journal-Bearings, of which the following is a specification.

The present invention relates to journal bearings and has particular application to certain novel and useful improvements in anti-friction journal bearings adapted to be employed for receiving a revolving element, such as a shaft, axle or the like, the device being especially applicable as a bearing for the axles of railway cars and similar heavy structures.

In the present instance, it is my purpose to provide a device of the class described which will embody the desired features of simplicity, strength, efficiency and durability.

Furthermore, I aim to provide an anti-friction journal bearing, wherein lubricating cavities or recesses are formed in the journal casing which are designed to be filled with a non-fluid oil or graphite or other lubricating material so that the bearing will be at all times lubricated thereby avoiding the liability of crystallized journals and, further reducing the accidents incident to lack of lubrication.

Still a further object of the invention is to provide a journal in which component parts may be readily assembled in position for use and which journal may be readily placed in the ordinary journal box such as is commonly carried by the drum or railway ties.

With the above-recited objects, and others of a similar nature in view, the invention consists in the construction, combination and arrangement of parts, set forth in and falling within the scope of the appended claim.

Figure 1:
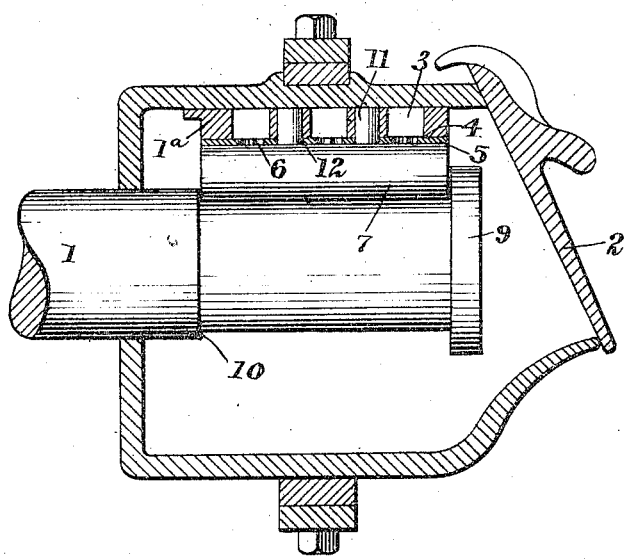
Figure 2:
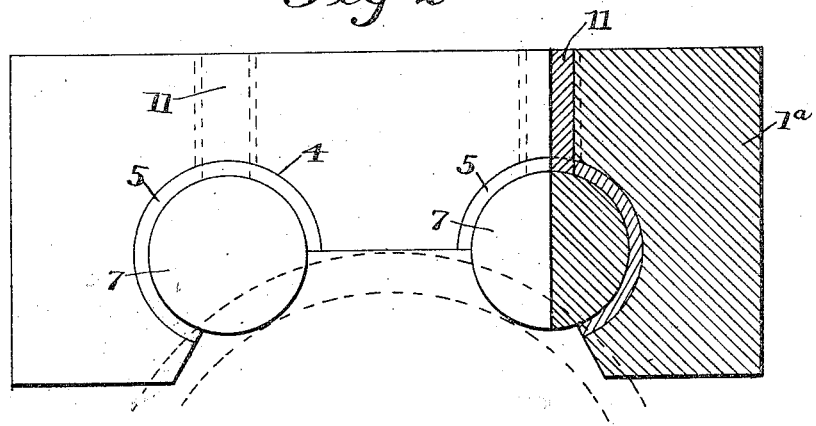
Figure 3:
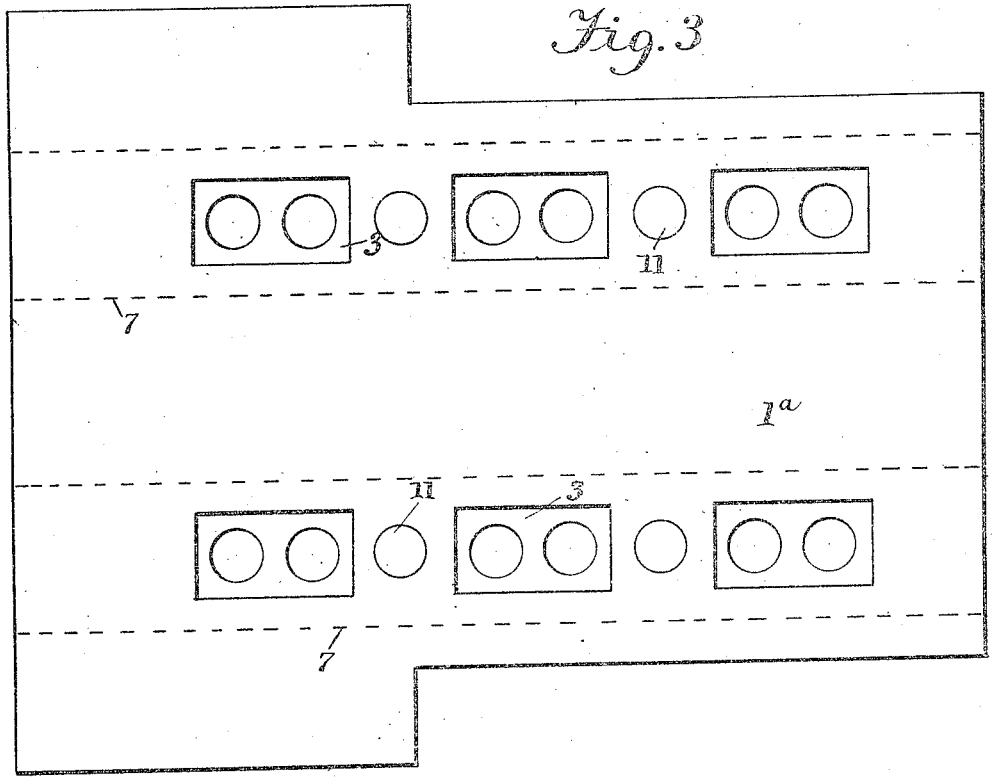
Figure 4:
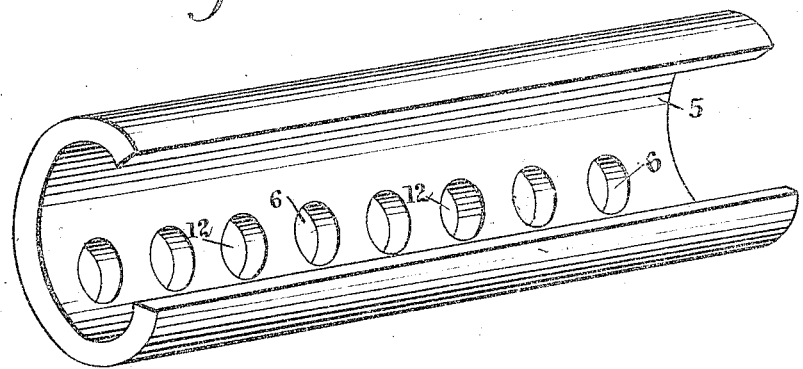

In the accompanying drawing:—Figure 1 is a longitudinal vertical sectional view of a journal box, showing the position of the axle and my improved anti-friction bearing applied thereto. Fig. 2 is a view, partly in elevation and partly in section of my improved anti-friction bearing, the sectional view being taken transversely and vertically through the axle and bearing. Fig. 3 is a top plan view of the casing for the bearing. Fig. 4 is a detail perspective view of one of the roller bearing sleeves.

Referring now to the accompanying drawing in detail, the numeral 1 indicates an ordinary type of railway car axle while 2 designates the usual form of journal box. Within said journal box and bearing against the axle is adapted to be placed my improved anti-friction journal bearing which, in the present instance comprises a box or casing 1ª of any suitable material, such as brass, malleable metal or the like. The top of this casing is formed with a series of cavities or recesses 3, which are adapted to be filled or packed with a lubricant of a non-fluid nature, such as graphite and a non-fluid oil, the cavities or openings communicating with the interior portion of the bearing.

The boxing or casing is provided with longitudinally extending grooves 4 partly circular in cross section and suitably spaced apart, each of said grooves being designed to receive a metal sleeve 5, also partly circular in cross section, said sleeve being preferably formed of hardened steel and provided with openings or passages 6 communicating with the recesses or cavities containing the lubricant, so that such lubricant may pass through the passages 6 into contact with the bearing rollers 7 lying in the sleeves. It will, of course, be understood that each sleeve carries a bearing roller so that in the structure shown in the present instance there are two of these bearing rollers 7 which are preferably constructed or turned from machines and extend longitudinally of the box or casing, although it will be understood that any suitable number of bearing rollers may be employed. The flange 9 of the car axle projects beyond the casing 1ª, the latter being retained in position on the axle between the flange 9 and the shoulder 10. In order to hold the sleeve against turning or rotation in the grooved portion of the casing, I provide vertically extending pins 11 which pass through the casing and into apertures or bores 12 formed in each sleeve. By such an arrangement, the pins hold the sleeves from turning while the bearing rollers are free to rotate or revolve in their respective sleeves.

From the above description, taken in connection with the accompanying drawings, the construction and manner of employing my improved journal bearings, especially upon reference to Fig. 1, will be apparent. It will be noted that the bearing will be easily and continuously lubricated by the body of lubricant placed within the lubricating cavities or recesses, the lubricant flowing through the communicating apertures or passages in the sleeve to the roller bearings. It will further be seen that I employ relatively few parts in the construction of my bearing so that the cost of manufacture of such bearing is reduced to a minimum.

While I have herein shown and described one particular embodiment of my invention, I wish it to be understood that I do not limit myself to all the precise details of construction herein set forth, as modification and variation may be made without departing from the spirit of the invention or exceeding the scope of the appended claim.

I claim:—

A journal bearing comprising a casing having pockets formed in the upper surface thereof and provided with longitudinally extending partly circular grooves in communication with the pockets, bearing sleeves mounted within the grooves and of a cross sectional configuration corresponding to the shape of the grooves and in open communication with the pockets, said casing and sleeves being provided with alining openings, pins in said openings and holding the sleeves against rotary and longitudinal movement, and bearing rollers rotatably mounted within said sleeves.

In testimony whereof I affix my signature in presence of two witnesses.

LEE McKAY.

Witnesses:
Geo. M. McGill,
H. T. McKay.